United States Patent Office 3,413,111
Patented Nov. 26, 1968

3,413,111
MANUFACTURE OF HERBICIDAL MATERIALS
John Theodore Braunholtz and Charles Shepherd, Bracknell, England, assignors to Imperial Chemical Industries Limited, London, England, a corporation of Great Britain
No Drawing. Filed Apr. 13, 1964, Ser. No. 359,438
22 Claims. (Cl. 71—94)

ABSTRACT OF THE DISCLOSURE

This invention consists of new process for quaternizing bipyridyls to form bis quaternary ammonium salts which have herbicidal activity.

---

This invention relates to manufacture of herbicidal materials and more particularly to the manufacture of bipyridylium quaternary salts.

It is known to manufacture bipyridylium quaternary salts by bringing a bipyridyl into reaction with a quaternising agent and a variety of such agents may be used for the purpose. Hitherto the processes have been carried out either by heating a mixture of the reactants alone or in the presence of an organic liquid. These processes however, possess a number of disadvantages. Thus when the reactants are heated alone a considerable amount of heat is evolved and consequently the reaction is difficult to control. Furthermore, the quaternary salts are obtained as solid masses the handling of which is especially difficult. With regard to the second process bipyridylium quaternary salts are soluble in water and they are generally used in the form of aqueous solutions. When therefore an organic liquid is used in the quaternising process either the liquid must be removed before converting the salt into a composition suitable for application as a herbicide, or the liquid must be allowed to remain mixed with the salt and included later with the herbicidal composition. In either case whilst the organic liquid may provide certain advantages in facilitating the formation of the quaternary salt its subsequent removal from the reaction mixture or inclusion in the final herbicidal composition adds appreciably to the cost of the manufacture of the salt.

It has now been discovered that a 4,4′-bipyridyl can be converted readily into a 4,4′-bipyridylium diquaternary salt by heating the bipyridyl with a quaternising agent in the presence of water. Both substituted and unsubstituted bipyridyls are suitable although the latter are preferred because in general the corresponding salts are more active herbicides and are obtained more easily. A bipyridylium mono-quaternary salt may also be used and through their agency diquaternary salts are obtainable in which the group attached to the nitrogen atom can be the same or different. The term bipyridyl used hereinafter shall be taken to include a quaternisable 4,4′-bipyridylium monoquaternary salt.

The nature of the quaternising groups may vary considerably. However, all quaternising agents the use of which is comprehended within the scope of the invention have the capcaity of converting a bipyridyl or a bipyridylium mono-quaternary salt into a bypyridylium salt where a quaternising group of atoms provided by the agent becomes attached at least one nitrogen atom of the bipyridylium cation. Preferably the quaternising group is an organic aliphatic group although such groups may possess a non-aliphatic substituent. When a non-aliphatic substituent is present, it is separated preferably from the nitrogen atom or atoms of the bipyridylium cation by an aliphatic group for example a methylene group. Suitable quaternising groups are unsubstituted alkyl groups containing from 1 to 20 carbon atoms and preferably from 1 to 4 carbon atoms. The alkyl groups may also contain as a substituent, for example an alkoxy alkyl group, an amino group, a cyano group, a carbamoyl group, a carboxy group, a carboxy ester group, or a phenyl group. Where the substituent is a carbamoyl or an amino group one or more hydrogen atoms attached to the constituent nitrogen atoms may also be substituted by for example an alkyl group or an alkoxy group. The quaternising group may also be an alkenyl group. The quaternising group may also comprise a heterocyclic ring for example a morpholine ring, a piperidine ring or a triazine ring.

The quaternising agent will of necessity incorporate an atom or group of atoms which enable the quaternising reaction to take place and which in the resulting bipyridylium salt will constitute the anionic part of the salt. In general these atoms or groups of atoms include atoms of chlorine, bromine and iodine and groups including sulphates and sulphonates. For most purposes quaternising agents in the form of halo compounds are preferred because they are generally the easiest and cheapest to make and in addition they often react more readily with a bipyridyl.

The proportion of bipyridyl and water to be used will depend to some extent upon the concentration of quaternary salt required in the final reaction product. In general these proportions do not have any great effect on the process. However, in general from 1 to 10 times by weight of water based on the weight of bipyridyl gives good results whilst from 1 to 5 times is preferred. The processes themselves are generally easily effected mereby heating a mixture of the bipyridyl quaternary salt and water. In many instances the processes can be carried out at ordinary pressures although where a quaternising agent for example methyl chloride is gaseous under either atmospheric conditions or under the conditions of reaction the process may be carried out more rapidly under elevated pressures. The processes are generally carried out at a temperature above 60° C. as below this temperature there is a greater tendency for the bipyridyl to crystallise out in the form of a hydrate. Very good results are usually obtainable at temperatures between 75–120° C. an especially convenient method of preparation comprises heating the reaction mixture under partial reflux so that at least a portion of the water is removed by distillation. Some processes also proceed more satisfactorily if in addition to the water an organic liquid is present which is capable of forming an azeotropic mixture with water and then adjusting the conditions of heating so that the azeotrope is removed as the reaction proceeds.

The time required for the process is determined primarily by the balancing of heat liberated in the reaction and the heating or cooling required to maintain the relevant reaction temperatures and so will vary with the apparatus used. In general many processes require from ½ to 2 hours although there are others which may require much longer times.

The pH at which the process is carried out is of importance from the point of view of obtaining the best results. At pH above 8 there is a tendency for some bisquaternary salts to be decomposed or to discolour, whereas below pH 5 there is a tendency for the salts to hydrolize and to become converted into a bipyridylium salt having a hydrogen atom rather than a quaternary group attached to the nitrogen atom and such salts do not quaternise. In general therefore it is desirable to carry out the process within a range of pH of 5–8, the preferred range being dependent upon the quaternary salt which is to be made. Thus when for example 1,1'-dimethyl-4,4'-bipyridyl dimethosulphate is to be made by bringing 4,4'-bipyridyl into reaction with dimethyl sulphate a pH in the range of 6–7 is preferred.

In order to maintain the pH in the desired range the process is preferably carried out in the presence of an acid acceptor, the quantity and nature of which is appropriate for maintaining such a pH. Suitable acid acceptors are those which are effective at the required pH but do not take the pH beyond the set limit. Thus strong alkalies, for example caustic soda and barium hydroxide, are not suitable unless their addition to the reaction mixture, is so carefully controlled by some means, for example by a pH sensitive control operated by the pH of the reaction mixture that the mixture cannot become too alkaline. To avoid this difficulty an acid acceptor which is very sparingly soluble in water or acts as a buffer is preferred. Suitable examples of the former include calcium carbonate and magnesium carbonate, though others, for example magnesia or magnesium silicate, may be used if desired. Suitable examples of the latter are ammonium or alkali metal and particularly sodium salts of weak acids for example acetates, formates, citrates and various phosphates for example disodium hydrogen phosphate. The choice of acid acceptor will depend upon the final composition to be adopted for the use of the product and care may have to be taken to use an acid acceptor which will be compatible with the required formulation.

A major advantage of the present invention resides in the fact that the bipyridylium salts are obtainable in a form which requires little treatment before they are suitable for use as a herbicide. Thus in many cases the reaction products may require no more than some dilution with water before they are ready for application. In general if the reaction products are very acid a neutralising agent is usually added to bring the pH to within a range of pH 3–6. Other ingredients may also be added for example corrosion inhibitors and surface active agents. Suitable inhibitors include alkali metal borates, benzoates, chromates, molybdates and nitrites. Not all types of surface active agents are suitable, for example anionic surface active agents tend to exert an adverse influence on the herbicidal properties of the salts. For this reason cationic and preferably non-ionic surface active agents are employed. Suitable non-ionic surface active agents include condensation products of ethylene oxide with various substances containing a hydrogen atom capable of reaction with ethylene oxide for example alkyl phenols, especially octyl phenol and nonyl phenol, sorbitan monolaurate, oleyl alcohol and cetyl alcohol. A very satisfactory surface active agent comprises a reaction product of ethylene oxide with a long chain aliphatic amine.

This invention is illustrated by the following examples:

EXAMPLE 1

This example illustrates the preparation of 1,1'-dimethyl-4,4'-bipyridylium dichloride.

Methyl chloride gas was passed into a pressure vessel containing 4,4'-bipyridyl (31.2 gm.) dissolved in water (50 gm.) while the solution was heated to 130° C. The passage of the gas and the heating were maintained for 10 hours during which time 20.0 gm. of methyl chloride were absorbed. The reaction mixture was then cooled and was shown by chromatographic means to consist almost entirely of an aqueous solution of the required product.

EXAMPLE 2

To a solution of 156 parts of 4,4'-bipyridyl in 200 parts of water at 70° C., were added 14 parts of sodium acetate trihydrate. To this solution were then added, over a period of 2 hours, 255 parts of dimethyl sulphate (rendered acid-free by treatment with potassium carbonate) while maintaining good agitation and a temperature of 70° C. Stirring was then continued for 15 minutes longer after completing the addition. During the addition, and particularly towards the end of the addition, the pH of the mixture was checked to ensure neutrality. If necessary, small amounts of calcium carbonate were added to keep the pH in the range 5 to 6.

The volume of the resulting reaction mixture was 2.5 times that of the water used and was equivalent to a substantially 100° yield of 1,1' - dimethyl - 4,4' - bipyridylium di(methylsulphate), in the form of an 80% weight/volume solution. Analysis of the product revealed that the sulphate content was less than 0.5% and that only a trace (by paper chromatogram) of monoquaternary salt was present.

EXAMPLE 3

This example illustrates the preparation of 1,1'-dimethyl-4,4'-bipyridylium-di-p-toluene-sulphonate.

A mixture comprising 4,4'-bipyridyl (2.0 gm.), methyl-p-toluenesulphonate (3.7 gm.) and water (10.0 gm.) was heated for 15 minutes. During the process water was removed by distillation and the temperature of the boiling mixture rose from 105–120° C. The reaction mixture was then cooled and absolute ethanol (5 ml.) and then acetone (50 ml.) were then added to precipitate the salt. This was then filtered off, washed with acetone and dried. 4.2 gm. of the salt were obtained which corresponded to an 80% conversion of the bipyridyl used.

EXAMPLE 4

This example illustrates the preparation of 1,1'-di-(dodecyl)-4,4'-bipyridylium-di-p-toluene-sulphonate.

A mixture of 4,4'-bipyridyl (2 gm.), dodecyl-(p-toluenesulphonate) (3.7 gm.) and water (10 gm.) was heated for 10–15 minutes under conditions whereby water was allowed to be removed by distillation. During the process the temperature rose from 105–120° C. The product was then precipitated from the reaction mixture by adding first ethanol (5 ml.) and then acetone (50 ml.). 4.2 gm. of the required product were obtained which corresponded to an 80% conversion of the bipyridyl.

EXAMPLE 5

This example illustrates the preparation of 1,1'-di(2-hydroxyethyl) 4,4'-bipyridylium dichloride.

4,4'-bipyridyl (15.6 gm.), ethylene-chlorhydrin (18.0 gm.) and water (14 gm.) were heated together under reflux for a period of five hours during which time a proportion of the water was allowed to distil off. At the same time the temperature of the boiling mixture rose from 100–116° C. The reaction mixture was then cooled and mixed with absolute ethanol (120 ml.) to precipitate the dichloride which was then removed by filtration. 28 gm. of the required product were obtained which corresponded to a conversion of 89% by weight of the bipyridyl.

EXAMPLE 6

This example illustrates the preparation of 1,1'-di(diethylcarbamoyl-methyl) 4,4'-bipyridylium dichloride.

4,4'-bipyridyl (5.2 gm.) was dissolved in boiling water (20 gm.). A solution of diethylchloroacetamide in toluene was then added gradually to the boiling aqueous solution over a period of 1–2 minutes. Heating was then continued for a period of one hour during which time toluene was removed as an azeotropic mixture with water. On cooling 13.8 gm. of the required product were found to have been formed which corresponded to a 92.5% conversion of the bipyridyl.

EXAMPLE 7

This example illustrates the preparation of 1,1-di(diisopropylcarbamoyl methyl) 4,4' - bipyridylium dichloride.

4,4'-bipyridyl (1.56 gm.) was dissolved in water (10 gm.) and the solution mixed with di-isopropylchloroacetamide (3.5 gm.). The mixture was heated for 1½ hours and then cooled. The product was then precipitated from the cool solution by addition of ethanol (20 ml.) followed by di-ethyl ether (40 ml.). 4.7 gm. of the product were obtained which corresponded to a 90% conversion of the bipyridyl.

EXAMPLES 8–32

According to these examples a number of other 4,4'-bipyridylium quaternary salts were prepared by processes which were similar to one another. In these examples 4,4'-bipyridyl (1 mol) was dissolved in from 4 to 8 times its weight of water and the solution mixed with the appropriate quaternising agent (2 mols) which was a halide and generally a chloride. The mixture in each case was heated under reflux conditions for 30–60 minutes at a temperature of 85–95° C. The resulting products were obtained as aqueous solutions which were ready for conversion into herbicidal compositions suitable for application.

In order to isolate the salts for purpose of identification and determining the efficiency of the processes the solutions were evaporated to a state of near dryness under reduced pressure. Ethanol was then added and this also was removed by evaporation. Finally the products which usually comprised yellow crystals were washed with acetone and dried. In each case yields of bipyridylium salts were obtained which corresponded to a 50–80% by weight conversion of the original bipyridyl.

The different examples indicate the salts produced and in brackets the quaternising agent from which it was prepared.

Example 8.—1,1'-methyl ethyl-4,4' - bipyridylium diiodide made from methyl-4,4'-bipyridylium monoiodide as the 4,4'-dipyridyl and ethyl iodide as the quaternising agent.

Example 9.—1,1' - di(carboxymethyl)-4,4'-bipyridylium dichloride. [Chloroacetic acid.]

Example 10.—1,1'-dibenzyl-4,4'-bipyridylium dichloride. [Benzyl chloride.]

Example 11.—1,1'-dialkyl - 4,4' - bipyridylium dibromide. [Alkyl bromide.]

Example 12.—1,1'-di(3 - cyanopropyl)-4,4'-bipyridylium dichloride. [γ-Chloro-butyronitrile.]

Example 13.—1,1'-di(2 - amino-ethyl)-4,4'-bipyridylium dibromide dihydrobromide. [2-bromoethylamine hydrobromide.]

Example 14.—1,1'-di(4,6-diamino - 1,3,5-triazine-2-yl methyl)-4,4'-bipyridylium dichloride. [4,6-diamino-1,3,5-triazin-2-yl methyl chloride.]

Example 15.—1,1'-di(carbamoyl methyl)-4,4'-bipyridylium dichloride. [Chloroacetamide.]

Example 16.—1,1'-di(methylcarbamoyl methyl)-4,4'-bipyridylium dichloride. [N-methylchloroacetamide.]

Example 17.—1,1'-di(n-hexylcarbamoyl methyl)-4,4'-bipyridylium dichloride. [N-(n-hexyl)chloroacetamide.]

Example 18.—1,1'-di(2 - ethylhexyl carbamoyl methyl) - 4,4' - bipyridylium dichloride. [N - (2 - ethylhexyl)chloroacetamide.]

Example 19.—1,1' - di(3-isopropoxypropyl)carbamoyl methyl-4,4'-bipyridylium dichloride. [N - (3 - isopropoxypropyl)chloroacetamide.]

Example 20.—1,1'-di(N - 3,5,5-trimethylhexyl carbamoyl methyl)-4,4'-bipyridylium dichloride. [N-(3,5,5-trimethyl)hexyl chloroacetamide.]

Example 21.—1,1'-bis(di-n-hexylcarbamoyl methyl)-4,4'-bipyridylium dichloride. [N,N-di-n-hexyl chloroacetamide.]

Example 22.—1,1' - bis[di(2-methoxyethyl)carbamoyl methyl] - 4,4'-bipyridylium dichloride. [N,N-di-(2-methoxyethyl)chloroacetamide.]

Example 23.—1,1'-di(N-methoxy-N-methyl-carbamoyl methyl)-4,4'-bipyridylium dichloride. [N-chloroacetyl-O, N-dimethylhydroxylamine.]

Example 24.—1,1$_2$ - bis[di - (2-cyanoethyl)carbamoyl methyl]-4,4'-bipyridylium dichloride. [N-chloroacetyl-bis (2-cyanoethyl)amine.]

Example 25.—1,1'-di(piperidino carbonyl methyl)-4,4'-bipyridylium dichloride. [N-chloroacetyl piperdine.]

Example 26.—1,1' - di(4 - methylpiperidino carbonyl methyl)-4,4'-bipyridylium dichloride. [N - chloroacetyl-4-methyl piperidine.]

Example 27.—1,1' - di(3 - methylpiperidino carbonyl methyl) - 4,4'-bipyridylium dichloride. [N-chloroacetyl-3-methyl piperidine.]

Example 28.—1,1'-bis(2,6-dimethylpiperidino carbonyl methyl)-4,4'-bipyridylium dichloride. [N-chloroacetyl-2,4-dimethyl piperidine.]

Example 29.—1,1'-bis(3,5-dimethylmorpholino carbonyl methyl)-4,4'-bipyridylium dichloride. [N-chloroacetyl-3,5-dimethylmorpholine.]

Example 30.—1,1' - bis(2,6-dimethyl morpholino carbonyl methyl)-4,4'-bipyridylium dichloride. [N-chloroacetyl-2,6-dimethylmorpholine.]

Example 31.—1,1'-diphenacyl-4,4'-bipyridylium dibromide. [Phenacyl bromide.]

Example 32.—1,1'-di(neo-pentoxy carbonyl methyl)-4,4'-bipyridylium dibromide. [Neo-pentyl bromoacetate.]

What we claim is:

1. In the process of making a 4,4'-bipyridylium diquaternary salt by reacting a 4,4'-bipyridyl with a quaternizing agent, the improvement which comprises carrying out said reaction in an inert diluent consisting essentially of water.

2. A process according to claim 1 wherein the 4,4'-bipyridyl is 4,4'-bipyridyl.

3. A process according to claim 1 wherein the proportions by weight of water to the bipyridyl are in the ratio of 1–10:1.

4. A process according to claim 1 wherein the proportions by weight of water to the bipyridyl are in the ratio of 1–5:1.

5. A process according to claim 1 wherein the quaternising agent is an aliphatic halo compound.

6. A process according to claim 5 wherein the halo compound is a chloro or bromo compound.

7. A process according to claim 1 wherein the quaternising agent provides as a quaternising group an alkyl group.

8. A process according to claim 7 wherein the alkyl group is an unsubstituted alkyl group.

9. A process according to claim 8 wherein the alkyl group contains from 1–20 carbon atoms.

10. A process according to claim 9 wherein the alkyl group contains from 1–4 carbon atoms.

11. A process according to claim 10 wherein the alkyl group is a methyl group.

12. A process according to claim 7 wherein the alkyl group is a substituted alkyl group.

13. A process according to claim 12 wherein the substituted alkyl group contains a hydroxyl group.

14. A process according to claim 13 wherein the substituted alkyl group is a 2-hydroxy ethyl group.

15. A process according to claim 12 wherein the substituted alkyl group contains a carboxyl group.

16. A process according to claim 12 wherein the substituted alkyl group is a carboxymethyl group.

17. A process according to claim 12 wherein the substituted alkyl group contains a carbamoyl group.

18. A process according to claim 17 wherein the substituted group is a carbamoyl methyl group, said carbamoyl methyl group containing an N-ethyl or N-methyl substituent.

19. A process according to claim 1 wherein the reaction mixture is maintained at a pH of 5 to 8.

20. A process of making a herbicidal composition according to claim 19 comprising bringing a 4,4'-bipyridyl into reaction with a quaternising agent in the presence of an inert diluent consisting essentially of water and thereafter adding a non-ionic surface active agent to the reaction product.

21. A process according to claim 20 comprising heating 4,4'-bipyridyl with methyl chloride in the presence of an inert diluent consisting essentially of water the proportion of water and the bipyridyl being in the ratio of 1–10:1 and thereafter adding a non-ionic surface-active agent to the reaction product.

22. A process according to claim 20 wherein the pH of the reaction product is adjusted if necessary to bring within the range of 3 to 6.

References Cited

UNITED STATES PATENTS

| | | | |
|---|---|---|---|
| 2,972,528 | 2/1961 | Brian et al. | 260—296 |
| 3,156,551 | 11/1964 | Brian | 260—296 |

OTHER REFERENCES

Klingsberg: "Piperdine and Its Derivatives," Part II, pp. 2–5 (Interscience)(1961) QD401K5.

Chemical Abstracts, vol. 52, cols. 13723–4 (1958); Abstracting—Homer in J. Chem. Soc., pp. 1574–7 (1958).

HENRY R. JILES, *Primary Examiner.*

R. T. BOND, *Assistant Examiner.*